United States Patent [19]
Chambers et al.

[11] Patent Number: 5,961,640
[45] Date of Patent: Oct. 5, 1999

[54] VIRTUAL CONTIGUOUS FIFO HAVING THE PROVISION OF PACKET-DRIVEN AUTOMATIC ENDIAN CONVERSION

[75] Inventors: Peter Chambers; Scott Edward Harrow, both of Scottsdale; David Evoy, Tempe, all of Ariz.

[73] Assignee: VLSI Technology, Inc., San Jose, Calif.

[21] Appl. No.: 08/838,021

[22] Filed: Apr. 22, 1997

[51] Int. Cl.[6] .................................................. G06F 17/00
[52] U.S. Cl. .......................................... 712/300; 395/500
[58] Field of Search ............................ 712/300; 710/129, 710/131, 127; 711/109, 110; 395/500

[56] References Cited

U.S. PATENT DOCUMENTS

| | | | |
|---|---|---|---|
| 5,351,047 | 9/1994 | Behlen ...................................... | 341/67 |
| 5,857,083 | 1/1999 | Venkat .................................... | 710/129 |
| 5,867,672 | 2/1999 | Wang et al. ............................ | 710/127 |
| 5,867,675 | 2/1999 | Lomelino et al. ...................... | 710/129 |
| 5,867,690 | 2/1999 | Lee et al. ................................ | 395/500 |
| 5,881,259 | 3/1999 | Glass et al. ............................. | 712/210 |

OTHER PUBLICATIONS

James; "Multiplexed Buses; The Endian Wars Continue"; *IEEE Mirco*, Jun. 1990.

*Primary Examiner*—Larry D. Donaghue
*Attorney, Agent, or Firm*—Wagner, Murabito & Hao LLP

[57] ABSTRACT

An endian domain conversion circuit for converting data packets transmitted between two bus interfaces. The novel system advantageously eliminates any requirement for a large bit switch within the circuit's write data path. Instead, endian conversion intelligence is placed into the read data path. Double words (dwords) are individually received from an incoming data packet and bytes are parallel stored into the same byte location of several different first-in-first-out (FIFO) memories. In one example, the dwords are 32-bits each and the number FIFO memories used is four. An entire input data packet is received in this manner, incrementing the write address of the FIFO memories for each dword. Depending on the type of endian domain conversion required, if at all, endian conversion control circuitry of the present invention controls the manner in which the four exemplary FIFO memories are read (via a read pointer) and the manner which their data is supplied over the output bus to generate the output data. In one embodiment, a byte stream is generated over the output bus. Alternatively, dwords are sent over the output bus in proper endian domain format. Data descriptors located in a data packet header define the endian input domain format, the expected endian output domain format, the data packet size and the start address in system memory of the input data packet. The novel system is well suited to process arbitrarily sized data packets as well as data packets starting at arbitrary byte boundaries.

19 Claims, 13 Drawing Sheets

VIRTUAL CONTIGUOUS FIFO HAVING THE PROVISION OF PACKET-DRIVEN AUTOMATIC ENDIAN CONVERSION

TECHNICAL FIELD

The present invention relates to the field of data packet transmission between computer systems. More specifically, the present invention relates to the field of data conversion between systems having different data format domains.

BACKGROUND ART

Modern computer systems have the capacity to store in memory, manipulate and transmit data in byte-blocks. Universally, a data byte contains eight bits of information. Typically, a data "word" consists of two bytes of data or 16 bits and a double word, "dword," consists of four bytes or 32 bits of data. In a 32-bit computer system, a dword of data can be addressed by a single address location, e.g., address n, and all 32 bits of the dword are presented on the 32-bit data bus in parallel. Historically, there are two different byte ordering formats which define the sequence in which individually addressed bytes are stored in the dword. Some computers, like the x86 architecture systems, use little endian format while other computer systems, like Motorola architecture systems, use big endian format.

FIG. 1A illustrates a byte ordering format called "little endian" 12 in which individually addressed bytes of a dword are stored in sequence starting from the least significant end (right hand side) of the dword and increase in address sequence to the most significant end (left hand side), e.g., byte #0, byte #1, byte #2, byte #3. This format is referred to as "little" endian because the bytes in ascending address order are filled from the least significant end of the dword. In "big endian" 14, individually addressed bytes of a dword are stored in ascending address sequence starting from the most significant end (left hand side) of the dword and increase to the least significant end (right hand side), e.g., byte #0, byte #1, byte #2, and byte #3. This format is referred to as "big" endian because the bytes in ascending address order are filled from the most significant end of the dword. As shown by a dword represented on the data bus, in either of the above formats, the least significant byte of the dword is presented on data lines "A" (D7:D0), and next-to-the least significant byte of the dword is presented on data lines "B" (D15:D8), the next-to-the most significant byte of the dword is presented on data lines "C" (D23:D16) and the most significant byte of the dword is presented on data lines "D" (D31:D24).

If packet data is always defined in the same size, or is naturally address aligned (e.g., bytes at any address, or words on modulo-2 address boundaries, or dwords on modulo-4 addresses), then endian domain conversion is not complicated. In reality, however, data packets consist of a mix of differently sized operands aligned at address boundaries that are completely arbitrary. With byte, word and dword accesses moving data at odd-byte and off-word boundaries, the permutations involved in steering the data become very difficult for a conversion circuit. FIG. 1B illustrates a generalized flow of data from one endian 10 domain to another 26. So is the start address for Data Packet 0 (numbered 30) and $E_0$ is the end address for Data Packet 0. Packets 1 and 2 (numbered 32 and 34) are numbered similarly. All addresses may be assigned arbitrarily by software to be of any byte location within system memory. In this environment, conversion between endian domains (e.g., little to big and big to little) is a complicated problem faced between computer systems when data packets of arbitrary data size and address alignment need to be transferred between computer systems. It would be advantageous to provide an endian conversion circuit that has the flexibility to convert data packets starting on arbitrary address boundaries and of arbitrary packet lengths.

FIG. 2 illustrates a prior art system 11 for performing endian conversion between a first bus of one endian domain format 10 and a second bus of another endian domain format 26. In this system 11, an endian domain formatted dword from 10 enters a 32-bit register 12, is manipulated by a 32-bit to 32-bit switch 14, and its four bytes are independently routed to four FIFOs 16, 18, 20, and 22. The bytes are then multiplexed in a standard (e.g., predetermined) sequence by multiplexer 24 and output in a byte stream over bus 26. The logic 28 required to perform the endian domain conversion operates on the write side by controlling switch 14, via control bus 14a, as the data is written into FIFOs 16–22. Switch 14 while functional, is very expensive to implement in terms of silicon area and circuit resources and slows down the write data path considerably. It would be advantageous to provide an endian conversion circuit that eliminates the need for a large bit switch 14 to simplify and thereby improve the data throughput speed of the write path.

Accordingly, what is needed is an endian conversion circuit that has the flexibility to convert data packets that start on arbitrary address boundaries and are of arbitrary packet lengths. The present invention provides such a flexible system. Further, what is needed is an endian conversion circuit that eliminates the large bit switch on the write path. The present invention provides such a system. These and other advantages of the present invention not specifically recited above will become apparent within further discussions of the present invention presented herein.

DISCLOSURE OF THE INVENTION

An endian domain conversion circuit for converting data packets transmitted between one bus and another is described herein. The novel system advantageously eliminates any requirement for a large bit switch placed in the write data path. Instead, endian conversion intelligence is placed into the read data path. Double words (dwords) are individually received from an incoming data packet and bytes are parallel stored into the same byte location of several different first-in-first-out (FIFO) memories, e.g., RAMs. In one example, the dwords are 32-bits each and the number of FIFO RAMs used is four, each FIFO RAM storing one byte. The system receives an entire input data packet in this manner, incrementing the address of the FIFO RAMs for each new dword. Depending on the type of endian domain conversion required, if at all, an endian conversion control circuit of the present invention controls the manner in which the four exemplary FIFO RAMs are read and the manner which their data is supplied over the output bus to generate the output data packet or byte stream. In order to perform the above, the control circuit controls a byte-addressed read pointer. In one embodiment, a byte stream is generated over the output bus. In another embodiment, dwords are sent over the output bus in the proper endian domain format. Data descriptors located in a data packet header define the endian input domain format, the expected endian output domain format, the data packet size and the start address in system memory of the input data packet. The novel system is well suited to process arbitrarily sized data packets as well as data packets starting at arbitrary byte boundaries.

More specifically, embodiments of the present invention include a circuit for performing endian format conversion on an input packet originating from a first bus, the circuit comprising: a plurality of FIFO memory units coupled to receive a plurality of double words of the input packet, wherein respective bytes of a respective double word are stored into respective FIFO memory units of the plurality of FIFO memory units; a multiplexer coupled to each of the plurality of FIFO memory units, the multiplexer controlled by a signal bus and for generating an output byte stream for a second bus; a write pointer register for storing double word write addresses which address all of the FIFO memory units in parallel per write cycle to store a double word of the input packet; a read pointer register for storing byte read addresses of the FIFO memory units which address only one FIFO memory unit per read cycle; and a control circuit for reading an endian alignment descriptor of the input packet indicating a first endian format of the first bus and a second endian format of the second bus, the control circuit responsive to the endian alignment descriptor for performing endian conversion during read cycles of the plurality of FIFO memory units by controlling the read pointer register and the signal bus to access and supply bytes from the plurality of FIFO memory units in predetermined orders.

BEST MODE FOR CARRYING OUT THE INVENTION

In the following detailed description of the present invention, numerous specific details are set forth in order to provide a thorough understanding of the endian domain format conversion circuit of the present invention. However, it will be obvious to one skilled in the art that the present invention may be practiced without these specific details or by using alternate elements or methods. In other instances well known methods, procedures, components, and circuits have not been described in detail as not to unnecessarily obscure aspects of the present invention.

Hardware Block Diagrams

Figure 3A:
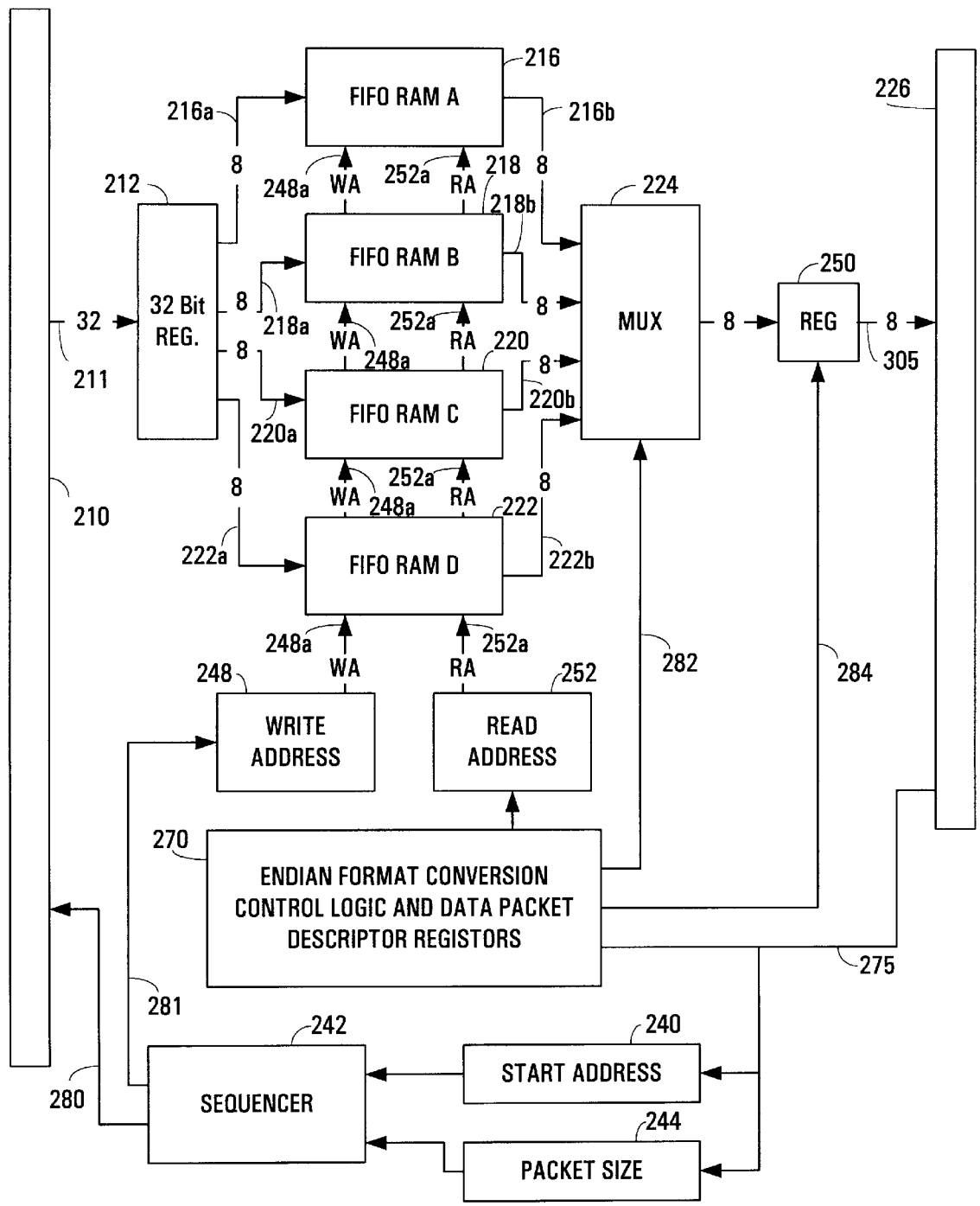
FIG. 3A illustrates a block diagram of the circuitry of one embodiment of the contiguous FIFO design having packet-driven endian conversion circuitry of the present invention and generating a stream of byte output data.

FIG. 3A is a block diagram of an endian conversion FIFO (ECF) circuit 200 of one embodiment of the present invention. Generally, data packets of one endian domain format originate from a first bus interface 210, e.g., a 32-bit Peripheral Component Interconnect (PCI) bus, are received over 32-bit bus 211, translated by ECF circuit 200, and then supplied by ECF circuit 200 as a single contiguous byte stream. The single contiguous byte stream is supplied over an 8-bit bus 305 to a second bus interface 226 having a possible second endian domain. In one implementation, the input data packets are in the form of 32-bit double words (dwords) and they can be of arbitrary byte size and arbitrary address alignment. Within one implementation of circuit 200, the FIFO RAMs 216, 218, 220, and 222 store up to 128 dwords. This means that data packets can have a length of anywhere between four and 512 bytes and packets can begin and end on arbitrary address boundaries. As a consequence of the above, for performing endian domain translation, is not feasible simply to inverse the write and read back addressing for each dword data packet from one FIFO RAM of 216, 218, 220, and 222 to the next on a sequential basis. As described further below, complex endian domain translation procedures of the present invention are implemented in an endian format conversion control logic circuit 270 (control circuit 270).

Figure 6:
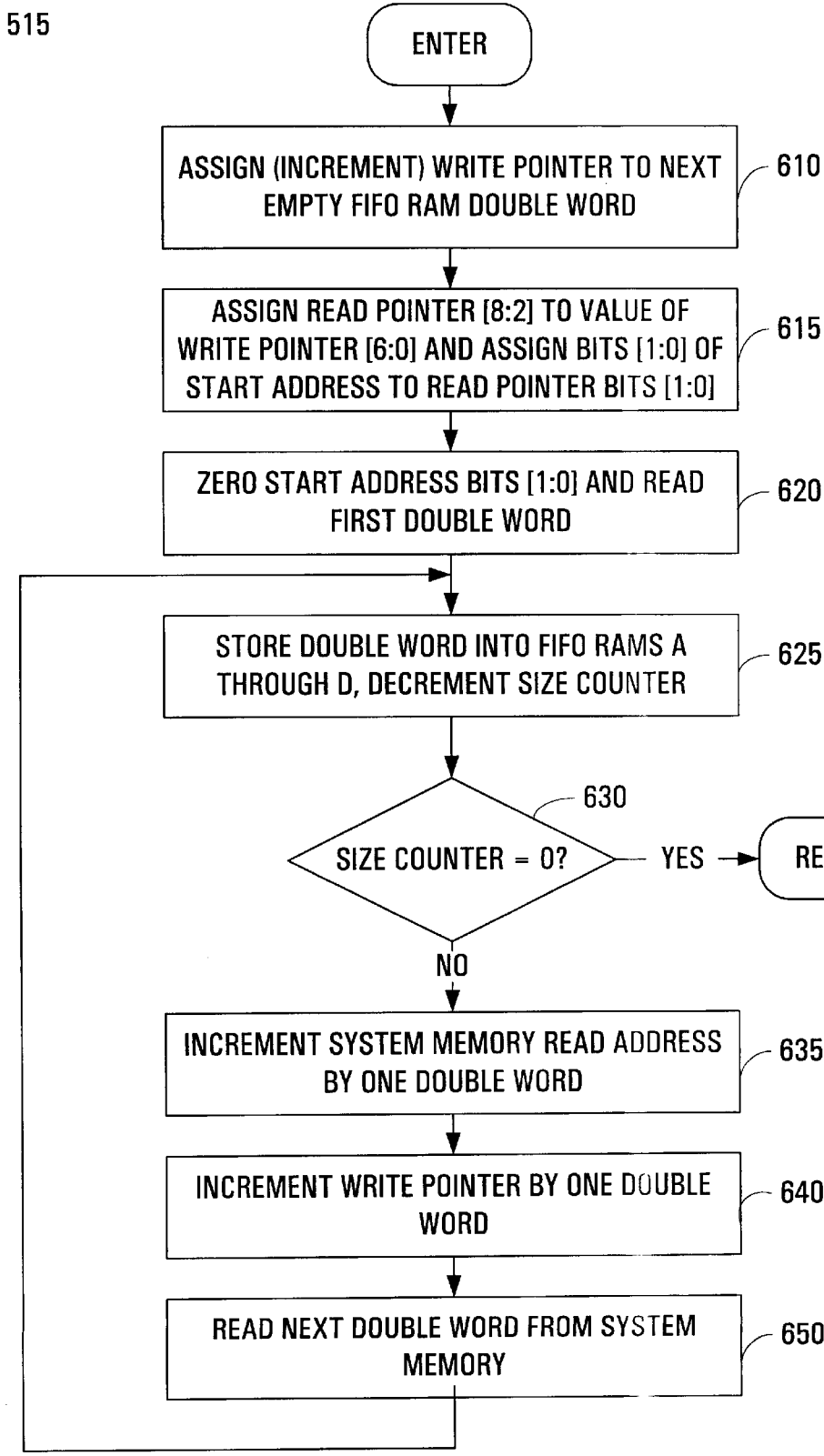
FIG. 6 is a flow diagram of steps performed by the present invention during the write cycle when packet data is written into the addresses of the FIFO.

In FIG. 3A, the data packets obtained from the first bus 210 are supplied to a 32-bit incoming data register 212. In one exemplary implementation, circuit 200 accepts a 32-bit operand every clock edge (every 30 ns with an exemplary 30 MHz PCI clock source). The 32-bit dword stored in the incoming data register 212 is then parallel loaded, one byte each, into FIFO RAMs 216, 218, 220, and 222 using 8-bit data lines 216a, 218a, 220a, and 222a, respectively. During this write cycle, each FIFO RAM is addressed with the same address value using a common write bus 248a. Specifically, the four bytes are stored in the same FIFO address as indicated by the write address value stored in write address register 248 and presented over write address bus 248a during a write cycle. In all cases during a write cycle, the least significant eight data lines (D7:D0) of the dword are stored in FIFO RAM A 216, the next eight data lines (D15:D8) of the dword are stored in FIFO RAM B 218, the next eight data lines (D23:D16) of the dword are stored in FIFO RAM C 220, and the most significant eight data lines (D31:D24) of the dword are stored in FIFO RAM D 222. Each FIFO RAM 216, 218, 220, and 222 is of a fixed length, e.g., 128 bytes, but can be of any size within the scope of the present invention. Write cycles continue until all of the dwords of the input data packet are stored into the FIFO RAMs 216, 218, 220, and 222. The operation of the write cycle for an input data packet is described in more detail below (FIG. 6).

In FIG. 3A, as the input data stream is stored into the FIFO RAMs 216, 218, 220, and 222, a sequencer 242, controlled from data descriptor information, sequences the write address register 248 via control bus 281. The sequencer 242 also sequences read addresses to the system memory via bus 280 to access the dwords of the input data packet. Sequencer 242 is coupled to start address register 240 and to packet size register 244. Both of these registers are initialized from packet descriptor information.

In FIG. 3A, the read circuitry of ECF circuit 200 is also shown. Endian conversion is performed during the read cycles. Each FIFO RAM of 216, 218, 220, and 222 can be addressed during a read cycle by common read address bus 252a which presents read addresses from a read address register 252. Control circuit 270 of the present invention controls the sequence in which FIFO RAMs 216, 218, 220, and 222 are read during a read cycle to perform endian conversion, as required. During a read cycle of ECF circuit 200, a single byte is read out of one FIFO RAM of 216, 218, 220, and 222 and multiplexed by mux 224 over an 8-bit data line 305 and onto the second bus interface 226. It is appreciated that an optional eight bit register 250 can be used as an intermediate storage place. The multiplexer 224 is also controlled via control signals on bus 282 originating from the control circuit 270 of the present invention.

Figure 1A:
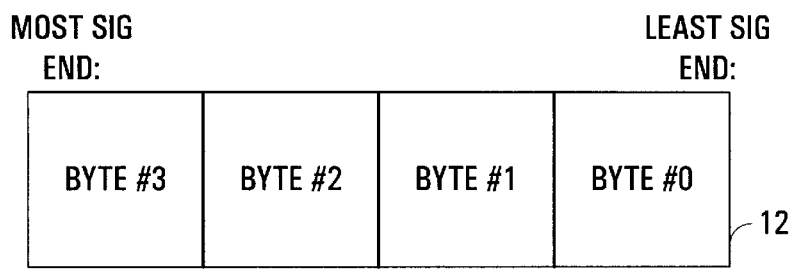
FIG. 1A illustrates little and big endian byte ordering formats within a dword.
Figure 1A:
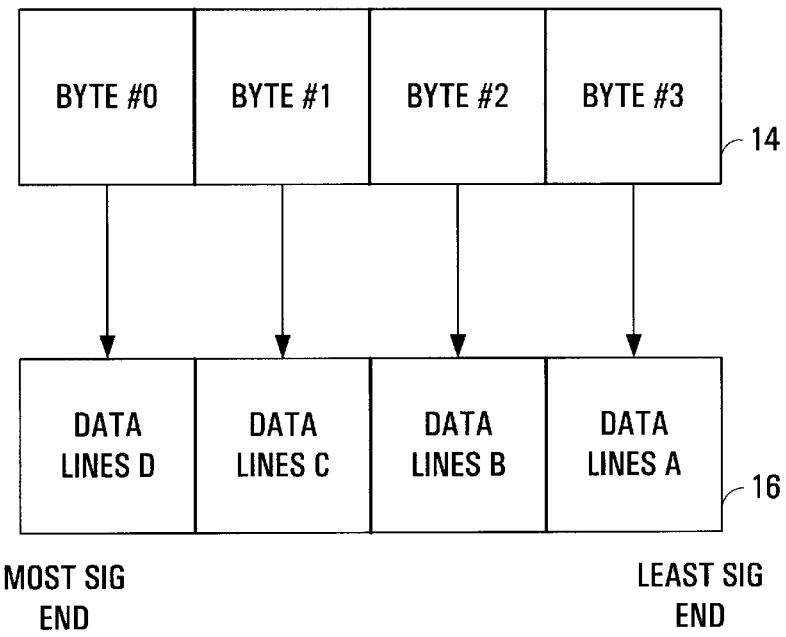
Figure 1B:
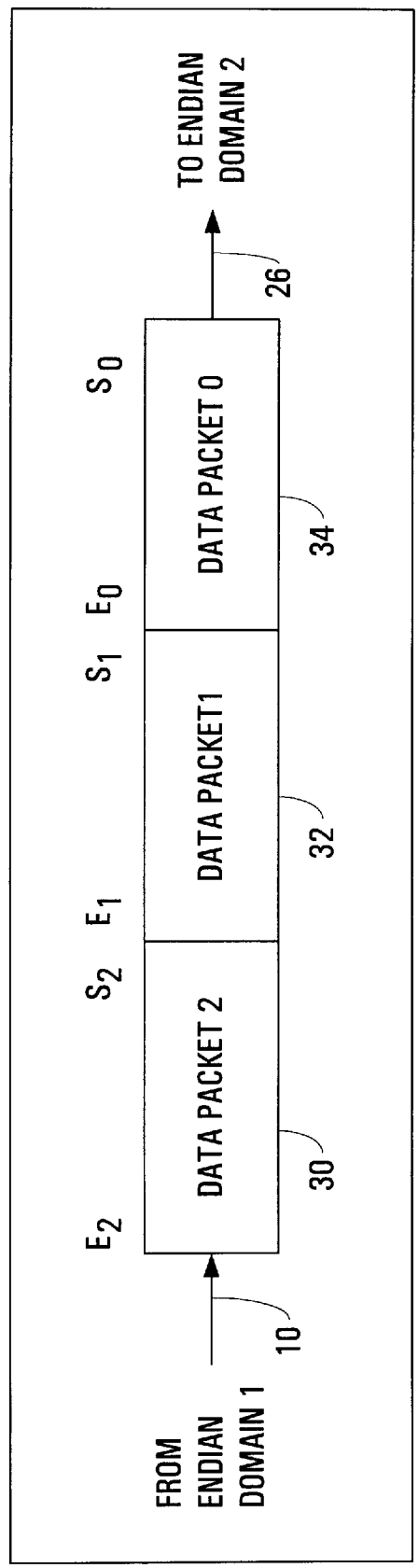
FIG. 1B is a diagram illustrating an organization of data packets between one endian domain (input) and a second endian domain (output).
Figure 2:
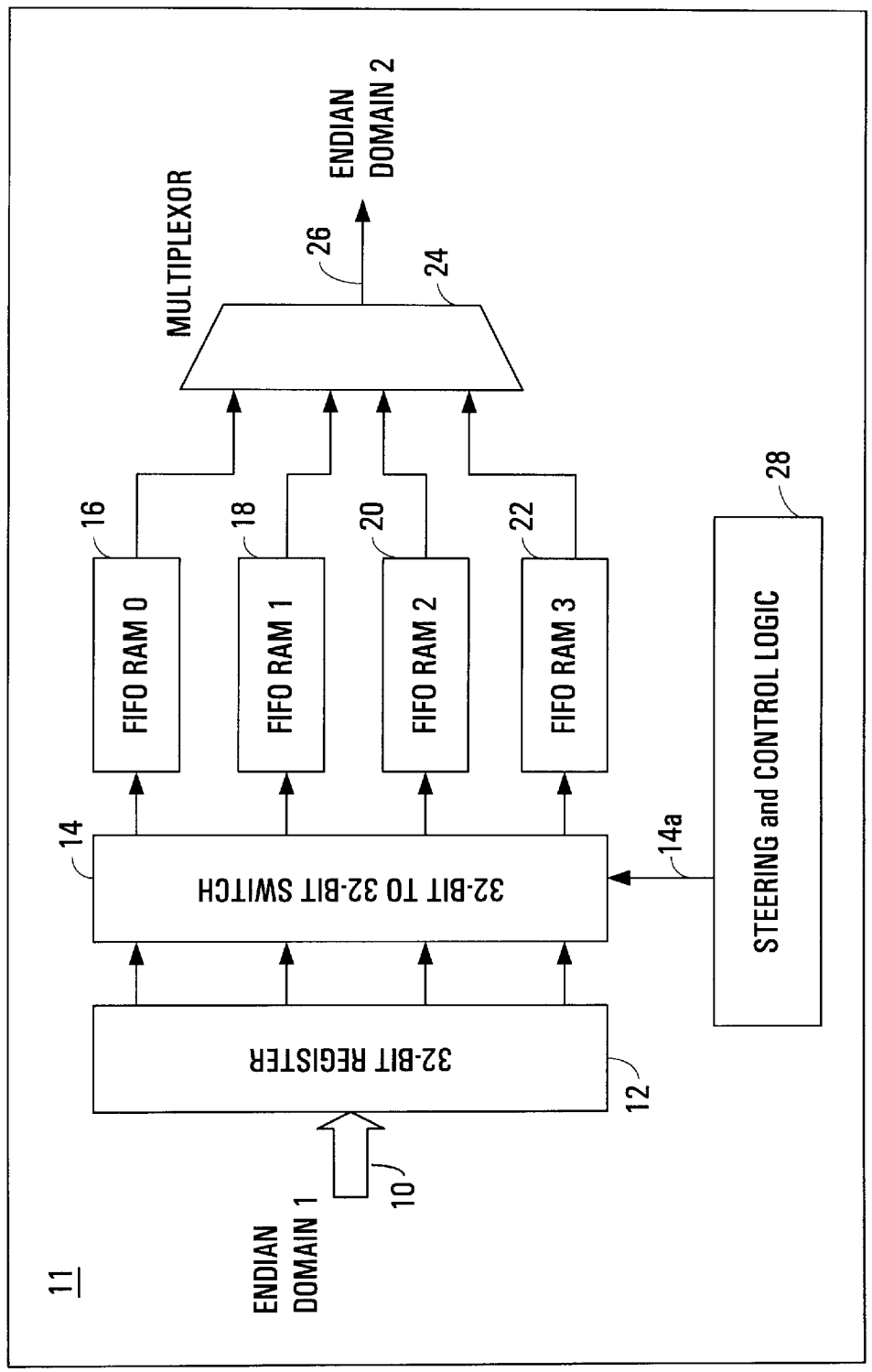
FIG. 2 is a block diagram of a prior art circuit for converting data packets from one endian domain into a second endian domain using intelligent write circuitry.

Generally, by eliminating the large-bit data switch in the write side data path, the present invention allows quick and simple parallel loading of the FIFO RAMs 216, 218, 220, and 222. The "intelligence" for circuit 200's operation is implemented in control circuit 270 and is operated in the read side of the FIFO memories 216, 218, 220 and 222. During the read cycles, the control circuit 270 of the present invention intelligently manipulates the read address register 252 to access the stored data in the correct byte ordering to perform endian conversion, as required. A set of data packet descriptors (DPD) is employed to permit parallel loading of the FIFO RAMs 216, 218, 220 and 222 thereby dispensing with the data switch 14 of FIG. 2. Circuit 200 then intelligently manipulates read address 252 for each of the FIFO RAMs 216, 218, 220 and 222 to access the data correctly. By eliminating the large-bit data switch in the write side, a faster write data path is achieved.

Figure 3B:
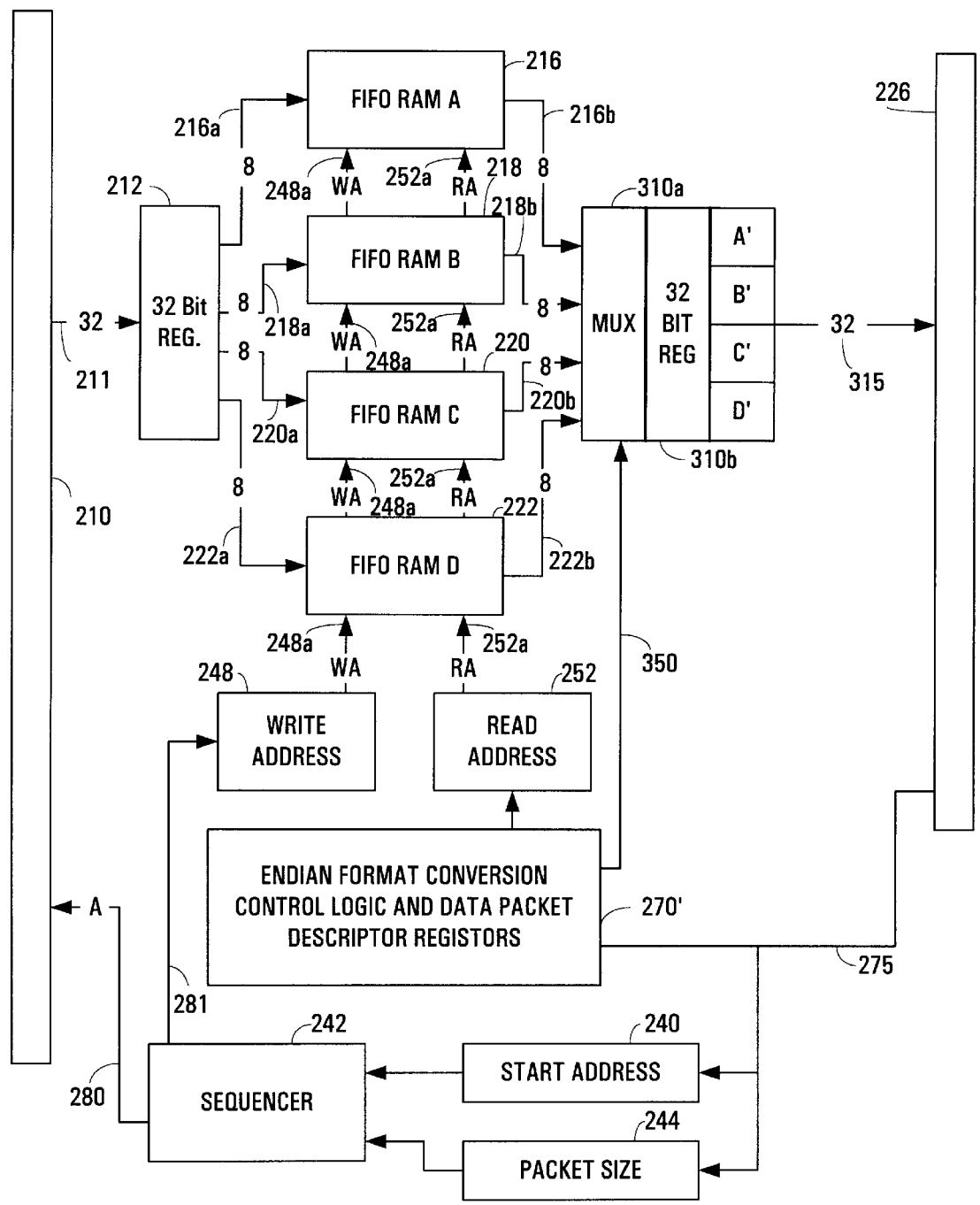
FIG. 3B illustrates a block diagram of the circuitry of a second embodiment of the contiguous FIFO design having packet-driven endian conversion circuitry of the present invention and generating 32-bit dwords as output.

FIG. 3B is a block diagram of an endian conversion FIFO (ECF) circuit 200a of a second embodiment of the present invention. The difference between circuit 200 (FIG. 3A) and circuit 200a is that circuit 200a outputs a 32-bit dword over a 32-bit output bus 315 to the second bus interface 226. Generally, data packets of one endian domain format from first bus interface 210 are received over 32-bit bus 211, translated by ECF circuit 200a, and then supplied by ECF circuit 200a as dword stream. The dword stream is supplied over a 32-bit bus 315 to the second bus interface 226 of having a possible second endian domain format. The input data packets are in the form of 32-bit dwords, and they can be of arbitrary byte size and arbitrary address alignment. Further, the FIFO RAMs 216, 218, 220, and 220 store up to 128 dwords. Except as described differently herein, circuit 200a is structurally and operationally equivalent to circuit 200.

In order to construct the 32-bit output dword, circuit 200a of FIG. 3B uses a multiplexer 310a and a 32-bit register 310b. In a first embodiment of circuit 200a, bytes are read, one byte each during the read cycles, from the FIFO RAMs 216, 218, 220, and 222 and multiplexed into their proper byte position (e.g., of A', B', C' and D') of register 310b. This is performed under the control of control bus 350 from control circuit 270 of the present invention. After four read cycles, register 310b is then full and a dword is sent over 32-bit bus 315 to second bus interface 226. In a second embodiment of circuit 200a, four multiplexers 310a are used such that all four bytes (e.g., of A', B', C' and D') of register 310b can be filled during a single read cycle in which the FIFO RAMs 216, 218, 220, and 222 supply four bytes in parallel. Although faster, this second embodiment of circuit 200a requires a complex multiplexer 310a.

Data Packet Descriptors

Figure 4A:
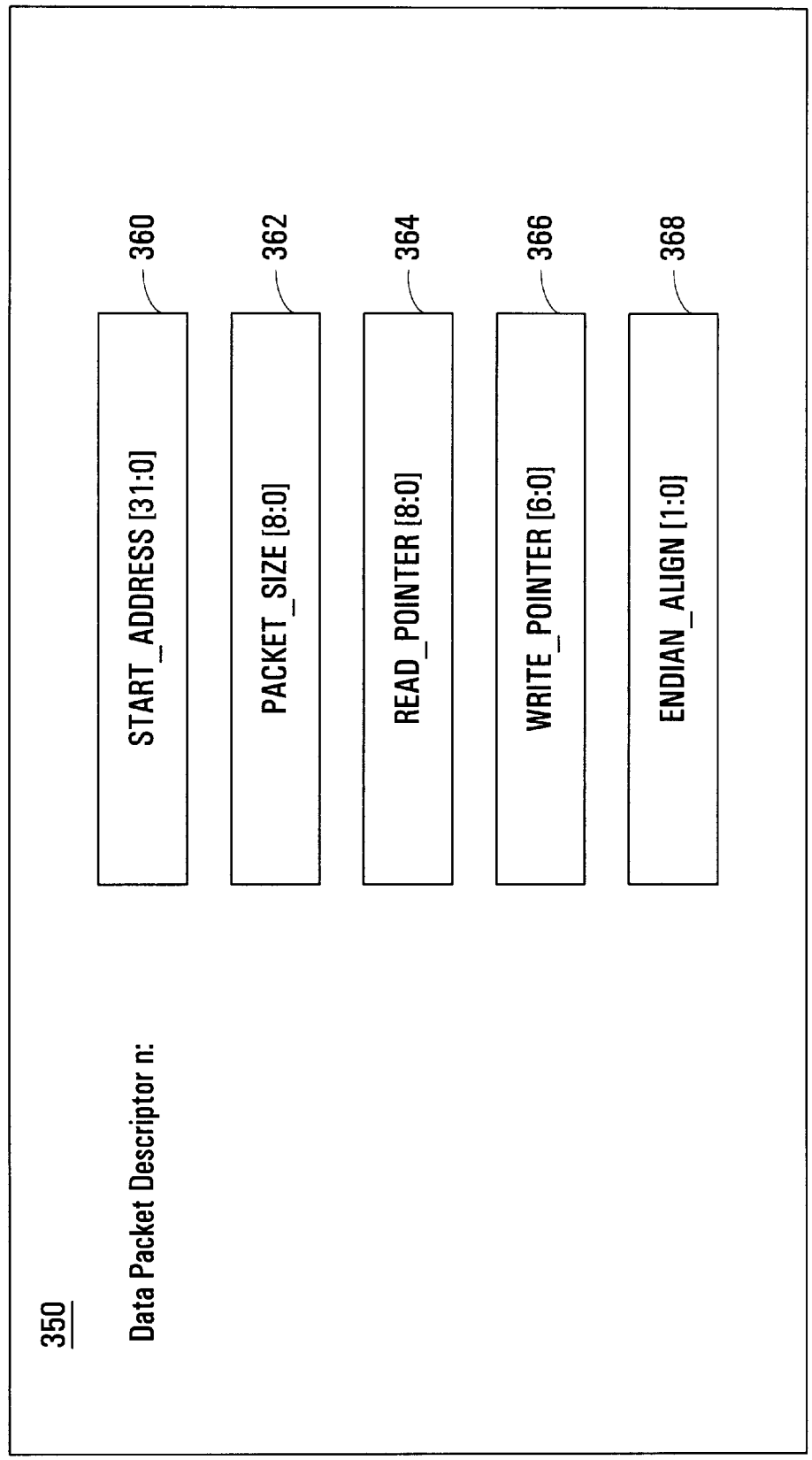
FIG. 4A is a block diagram of the format of the packet descriptors used within the first and second embodiments of the present invention.

To effect loading and unloading of data packets into the FIFO RAMs 216, 218, 220 and 222 (and thereby perform endian domain conversion), data packet descriptors are employed by the present invention which are shown in diagram form in FIG. 4A. The information for these data packet descriptors can originate from the first bus interface 210 or from the second bus interface 226. Each of the data packet descriptors consists of five fields. Field 360 is the START_ADDRESS [31:0] field which in one exemplary implementation is a 32-bit pointer to the start address of the input data packet in the system memory. The two least significant bits of this address have special importance for the read cycle of circuits 200 and 200a. The PACKET_SIZE [8:0] field 362 in one embodiment is a 9-bit value containing the length, in bytes, of the input data packet. In this example, data packets can be between 4 and 512 bytes in length, but larger packets can be accommodated by widening the exemplary PACKET_SIZE field 362.

The ENDIAN_ALIGN[1:0] field 368 of the present invention consists of two bits that are used to define the endian domain format of the input and the output data packets and define whether or not endian domain conversion is required by circuits 200 and 200a and also the required conversion manner. Specifically, bit 0 defines the input data packet endian orientation, where a data value of 0 represents little endian format and a data value of 1 represents big endian format. Bit 1 defines the output data packet endian orientation where a data value of 0 represents little endian format and a data value of 1 represents big endian format. ENDIAN_ALIGN[1:0] field 368 is stored in a register of control circuit 270.

In FIG. 4A, the read address or "pointer" value called, READ_POINTER [8:0] field 364, is maintained in read address register 252. The field 364 and the register 252 are used interchangeably herein. The READ_POINTER 364 is a byte address and initially maintains a byte-address pointer to the location within the FIFO RAMs 216, 218, 220 or 222 of the first byte of the input data packet. The READ_POINTER is incremented on a byte-by-byte basis during the read cycle as data is read from the FIFOs 216, 218, 220 or 222. A write address or "pointer" value called, WRITE_POINTER [6:0] field 366, is maintained by the write address register 248. The field 366 and the register 248 are used interchangeably herein. The WRITE_POINTER maintains a dword address pointer to the location within the FIFO 216, 218, 220 and 222 of the next dword to be written by incoming data and increments during the write cycle.

Three of the DPD fields of FIG. 4A are software loaded and include START_ADDRESS 360, PACKET_SIZE 362, and ENDIAN_ALIGN 368. Either bus 210 or bus 226 can initialize these. The remaining DPD fields, READ_POINTER 364 and WRITE_POINTER 366 are not loaded by data packet descriptor information but are maintained by hardware, e.g., registers 248 and 252. Generally, the READ_POINTER 364 and WRITE_POINTER 366 are used to manage data traffic into and out of the FIFOs 216, 218, 220 or 222 in a circular fashion. Specifically, the WRITE_POINTER 366 is updated by sequencer 242. The READ_POINTER 364 is intelligently updated by control circuit 270 to implement endian domain conversion, as required.

FIFO RAM Configuration

Figure 4B:
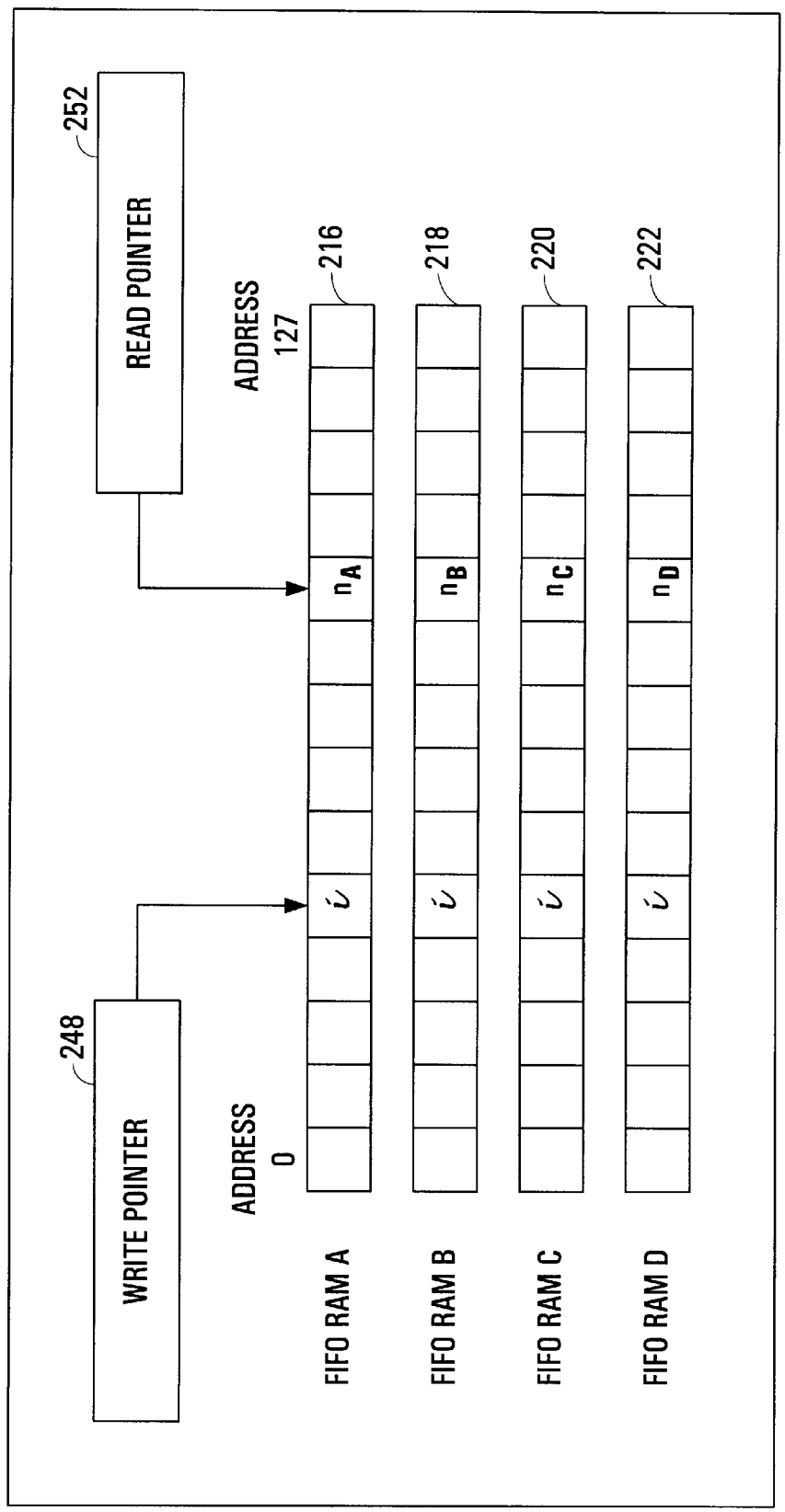
FIG. 4B is a block diagram illustrating the read and write pointers used in the FIFO circuit of the first and second embodiments of the present invention.

The manner in which circuits 200 and 200a use the data packet descriptors to write and then read the FIFO RAMs 216, 218, 220 and 222 is best understood following an explanation of the organization of the individual FIFO RAMs 216, 218, 220 and 222 which is shown in FIG. 4B. Consider each of the FIFO RAMs 216, 218, 220 and 222 as a set of four 8-bit by 128-bit RAMs, for instance, with read pointer 248 and write pointer 252 shown. This is illustrated in FIG. 4B by indicating a sample of the number of address positions in the RAMs 216, 218, 220 and 222 by vertical lines. Write pointer 248 addresses four bytes in parallel per clock cycle (one from each FIFO RAM) and is currently shown at dword address i. The write pointer is double-word oriented, since only complete dwords are written into the FIFO consisting of the four FIFO RAMs 216, 218, 220 and 222. The read pointer 252, on the other hand, is a byte address and addresses the bytes of FIFO RAMs 216, 218, 220 and 222 one byte per clock cycle in circuit 200 and in the first embodiment of circuit 200a. As shown, the read pointer requires four addresses (e.g., $n_A$, $n_B$, $n_C$, and $n_D$) to address all four bytes of a dword stored in FIFO RAMs 216, 218, 220 and 222. The read pointer 252 is byte-oriented because, in circuit 200 and in one embodiment of circuit 200a, bytes are read one at a time from the FIFO RAMs 216, 218, 220 and 222. However, in the second embodiment of circuit 200a, four read pointers are used to access four bytes per read cycle.

Processing Multiple Data Packets

The present invention can operate on multiple data packets simultaneously by the provision of multiple data packet descriptors. For instance, in one embodiment, three data packet descriptor sets, of the type described above, are available so that three packets can be active at the same time: 1) with one data packet being delivered to the second bus interface 226; 2) a second data packet residing complete and ready to be accessed by the second bus interface 226; and 3) a third data packet being written into the FIFO RAMs 216, 218, 220 and 222. It is appreciated that discussions of the present invention to follow describe the transfer and translation of a single data packet. However, given the descriptions herein, the present invention is well suited to be extended to process three data packets simultaneously in various transfer and translation states as described above.

Since the data packets end and start at adjacent dword addresses, circuits 200 and 200a initialize the read 252 and write 248 pointers for one packet by examining the pointers from the previous data packet. After a system reset, all pointers are initialized to zero, thus pointing to the beginning of the FIFO RAMs 216, 218, 220 and 222. Software control ensures that the FIFO RAMs 216, 218, 220 and 222 do not overrun in that software ensures that there is sufficient room in the FIFO RAMs to accommodate the data packet described in the next active data packet descriptor. To facilitate this, circuits 200 and 200a can supply two status bits in a status register to the software control. These status bits indicate: 1) FIFO empty, no data in FIFO RAMs; 2) FIFO full, FIFO RAMs are completely full; 3) Low-Water Mark, FIFO RAMs are almost empty; and 4) High-Water Mark, FIFO RAMs are almost full.

Operation of the Write and Read Cycles of the Present Invention

Figure 5:
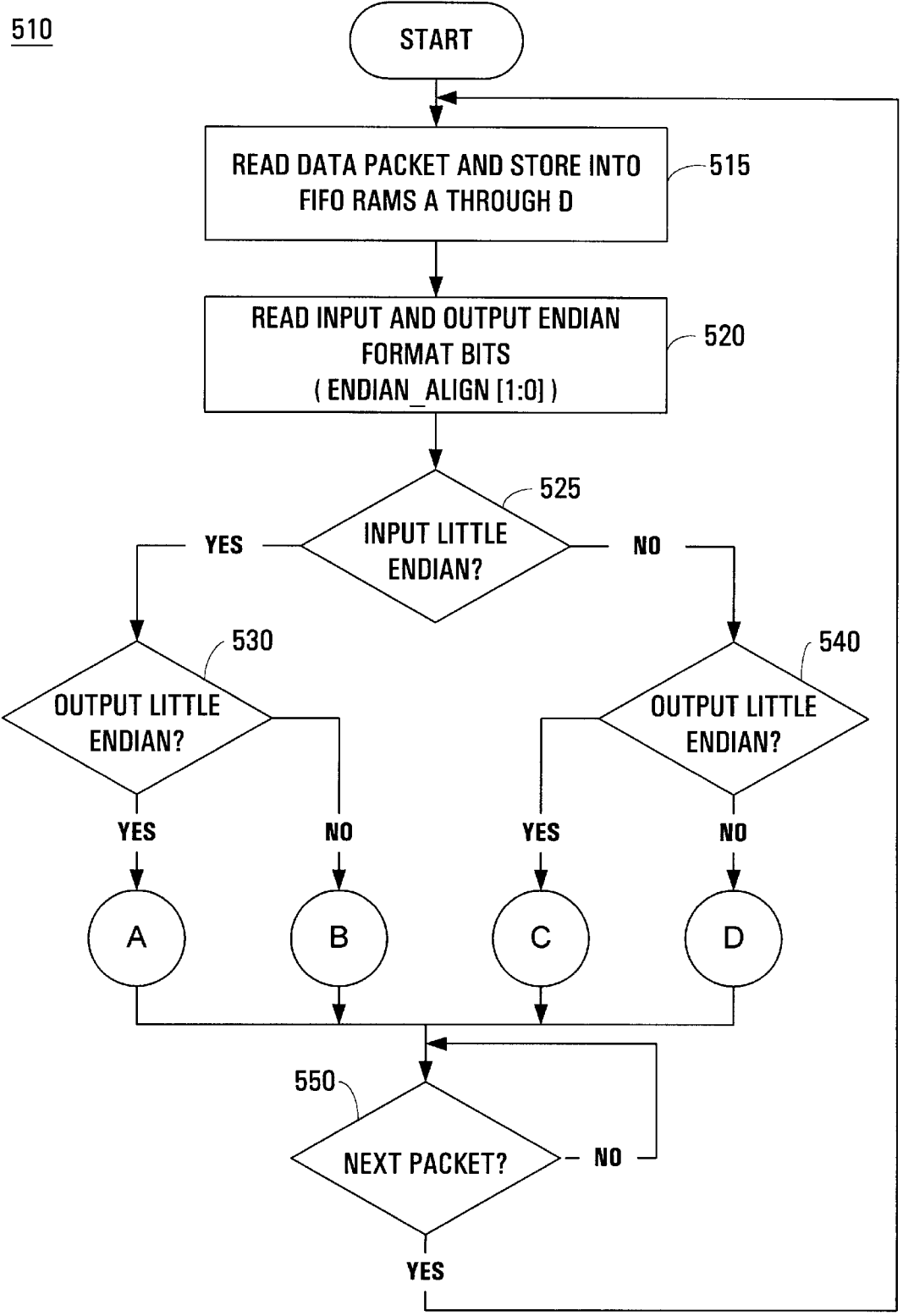
FIG. 5 is a flow diagram illustrating steps performed by the endian format conversion control logic of the present invention for a received data packet.

FIG. 5 is an overall data flow diagram illustrating the steps or functions performed by circuit 200 (and circuit 200a) during write and read cycles of the present invention. The process flow shown in FIG. 5 is implemented in control circuit 270 in hardware (e.g., state machine control). The write cycle implementation is described first, followed by the complex read cycle which performs the endian domain conversion within the embodiments of the present invention. Step 515 of FIG. 5 is invoked upon receipt of a new data packet from first bus interface 210. In step 515, the dwords of a new data packet are read and completely stored into the FIFO RAMs 216, 218, 220, and 222. Before step 515 is entered, data packet descriptor information for the new data packet is received by control circuit 270 (e.g., from first bus interface 210 or from second bus interface 226). In one implementation, this data packet descriptor information can be located in a data header that precedes each data packet received over first bus 210.

Circuits 200 and 200a configure FIFO RAMs 216, 218, 220 and 222 for the new data packet by writing the data packet descriptor and then initiating the data transfers. Both of the registers 240 and 244 are initialized by control circuit 270 based on information in data packet descriptor information of the new data packet. Specifically, the START_ADDRESS field 360 from the new data packet is loaded into start address register 240. The PACKET_SIZE field 362 of the new data packet is loaded into the packet size register 244 and the ENDIAN_ALIGN field 368 is loaded into a register within control circuit 270. Upon the data packet descriptor information being loaded, circuits 200 and circuit 200a are provided with the information necessary to transfer the exact amount of information from system memory to the second bus interface 226. It is appreciated that upon power up, the write pointer 248 and the read pointer 252 are reset. The operation of step 515 is described with reference to FIG. 6.

Write Cycle Operation of Present Invention

The data write path of the embodiments of present invention is streamlined and does not include a large multi-bit switch. FIG. 6 illustrates the steps performed by process 515 (of FIG. 5) during the write cycle. Steps 610 and 615 can be performed in any order. At step 610, bits 6:0 of the write pointer 248 are assigned to the next empty FIFO RAM dword address. This is performed because only complete 32-bit dwords are read from system memory and written into the FIFO RAMs 216, 218, 220, 222. There can be empty space in the FIFO RAMs 216, 218, 220, 222 between the end of one data packet and the start of the next. This empty space can be up to six bytes in length (e.g., three bytes from the starting dword of one packet and three bytes from the last dword of another). The present invention ensures that the write pointer 248 always starts with an empty dword which guarantees that good data is never overwritten, specifically good data located in the tail end of the preceding data packet. At step 615, bits [8:2] of the read pointer 252 are assigned to bits [6:0] of the write pointer so the read pointer will be initialized to the proper dword location at the start of the read cycle.

Secondly at step 615, bits 0:1 from the start address register 240 are assigned to the least significant end of the read pointer 252 so that the first byte of the data packet is correctly indexed during read back and translation. At the start of a transaction, read pointer bits [8:2] are the same as write pointer bits [6:0]. The read pointer's dword address is the same as the write pointer 248. The difference between the two is that the read pointer 252 also includes the information required to point to the first byte of the data packet, e.g., bits [1:0].

At step 620 of FIG. 6, the least significant start address bits [1:0] are zeroed to address the dword containing first byte of the new data packet. The resulting address gives the 32-bit address within the system memory of the dword containing the first byte of the new data packet. This establishes the specific start address in system memory. Also at step 620, the first dword of the new data packet is addressed and thereby obtained from system memory and stored into 32-bit register 212. At step 625, the dword from the 32-bit register is stored into the FIFO RAMs 216, 218, 220, and 222 into a dword as addressed by the write pointer 248. In this configuration, the least significant end of the dword is stored into FIFO RAM A 216 while the most significant end of the dword is stored into FIFO RAM D 222. Also at step 620, the packet size register 244 is decremented by the number of valid bytes received in the first dword of the input data packet.

At step 625, the byte order stored into FIFO RAMs 216, 218, 220, and 222 is the same regardless of the endian domain format of the new data packet. At step 630, the packet size register 244 is checked if it has a zero value. When this value counts down to zero, the new packet has been fully received and the write cycles are over (process 515 returns). At the end of the data packet, other software can be notified that the transfer is complete and all data has been successfully written into the FIFO RAMs 216, 218, 220, and 222.

At step 630 of FIG. 6, if the packet size register 244 is not zero, then at step 635, sequencer 242 increments the system memory address to the next dword address in system memory of the new data packet. This address is then presented over first bus interface 210 to address and thereby obtain the next dword of the new data packet. At step 640, the write pointer 248 is updated by one which then points to the next dword position of the FIFO RAMs 216, 218, 220, and 222. The write pointer 248 is always incremented to point to the next available completely empty dword in the FIFO RAMs 216, 218, 220 and 222. Also at step 640, the packet size register 244 is decremented by the number of valid bytes received in the latest read dword of the input data packet.

At step 650, the next dword of the new data packet is then read from system memory and stored in 32-bit register 212. No byte or word swapping (endian conversion) occurs while data is written into the FIFO RAMs 216, 218, 220, and 222. Step 625 is then performed in cyclic fashion as required. Data is read from system memory in dwords, regardless of the alignment of the start and end of the new data packet. This means that up to three "do not care" bytes can be written at the start and also at the end of the data packets, depending on the particular byte alignment encountered. The above steps are performed for both circuits 200 and 200*a* since they have the same write paths. It is appreciated that the software controller is responsible for checking that the new data packet of an appropriate size to fit into the FIFO RAMs 216, 218, 220, and 222 as circuit 200 and circuit 200*a* do not contain overrun circuitry in the implementations shown in FIG. 3A and FIG. 3B, respectively.

Read Cycle Operation of Present Invention

In FIG. 5, after a new data packet has been read and stored into the FIFO RAMs 216, 213, 220, and 222, circuit 200 or 200*a* then begins the process of performing endian conversion on the data, if required, and supplying the data to the second bus interface 226. These two tasks are completed during the read cycle of the present invention. The read cycle begins at step 520 of FIG. 5 where the control circuit 270 of the present invention reads the endian control bits that were stored in a register of the control circuit 270 upon receiving the data packet descriptor field 368 ENDIAN_ALIGN [1:0]. These bits inform the control circuit 270 of the endian domain format of the input data packet and also of the desired endian domain format of the output data. If the output data is to be a byte stream, as in circuit 200 (FIG. 3A), then the output endian domain format information is not entirely relevant. However, with respect to circuit 200*a* (FIG. 3B) the output endian domain format is critical because the output data is supplied in dword lengths.

At step 525, control circuit 270 reads bit 0 of ENDIAN_ALIGN [1:0] field 368 to determine if it is of value zero (little endian format). If so, then step 530 is entered as the input is in little endian format. If not, then step 540 is entered as the input is in big endian format. At step 530, control circuit 270 reads bit 1 of ENDIAN_ALIGN [1:0] field 368 to determine if it is of value zero (little endian format). If so, then "A" is entered (FIG. 7A) as the input is in little endian format and the output is little endian format and no conversion is required. If not, then "B" (FIG. 7B) is entered as the input is in little endian format but the output is in big endian format and endian conversion is required. Processes "A" and "B" both return to step 550.

At step 530 of FIG. 5, control circuit 270 reads bit 1 of ENDIAN_ALIGN [1:0] field 368 to determine if it is of value zero (little endian format). If so, then "C" is entered (FIG. 7C) as the input is in big endian format but the output is little endian format and endian conversion is required. If not, then "D" (FIG. 7D) is entered as the input is in big endian format and the output is in big endian format and endian conversion is not required. Processes "C" and "D" both return to step 550. The process steps of FIG. 7A, FIG. 7B, FIG. 7C and FIG. 7D perform the read cycle functions to completely read out the bytes of the input data packet, perform the required endian conversion, if necessary, and supply the data to the second interface bus 226. When completed, processing returns to step 550 where step 510 waits until a new input packet is signaled whereupon new data packet descriptors are received and step 515 is entered again.

Within the read cycles as described in FIG. 7A, FIG. 7B, FIG. 7C and FIG. 7D, the read pointer 252 is initialized to point to the exact byte location within the FIFO RAMs 216, 218, 220, and 222 of the first byte of the data packet. Bits [1:0] of the read pointer 252 are the same as bits [1:01] of the START_ADDRESS field 360, while bits [8:2] of the read pointer 252 are the same as the initial value of bits [6:0] of the write pointer 248. In general operation, data is read from the FIFO RAMs 216, 218, 220, and 222 by using the read pointer 252. Bits [8:2] select a dword location to read, while bits [1:0] of read pointer 252 select one byte via the multiplexer 224. Bytes are then read in the correct order when incrementing the read pointer by following the byte ordering given in FIG. 7A, FIG. 7B, FIG. 7C and FIG. 7D. The read address of register 252 and the select lines 282 of multiplexer 224 are controlled by control circuit 270 to perform endian conversion as required. Endian conversion, when needed, is implemented by the present invention control circuit 270 by manipulating the direction by which the addresses increment through the FIFO RAMs 216, 218, 220, and 222 taking into consideration: (1) that the data packet can start on an arbitrary byte boundary; and (2) that the data packet can have an arbitrary byte size.

Figure 7A:
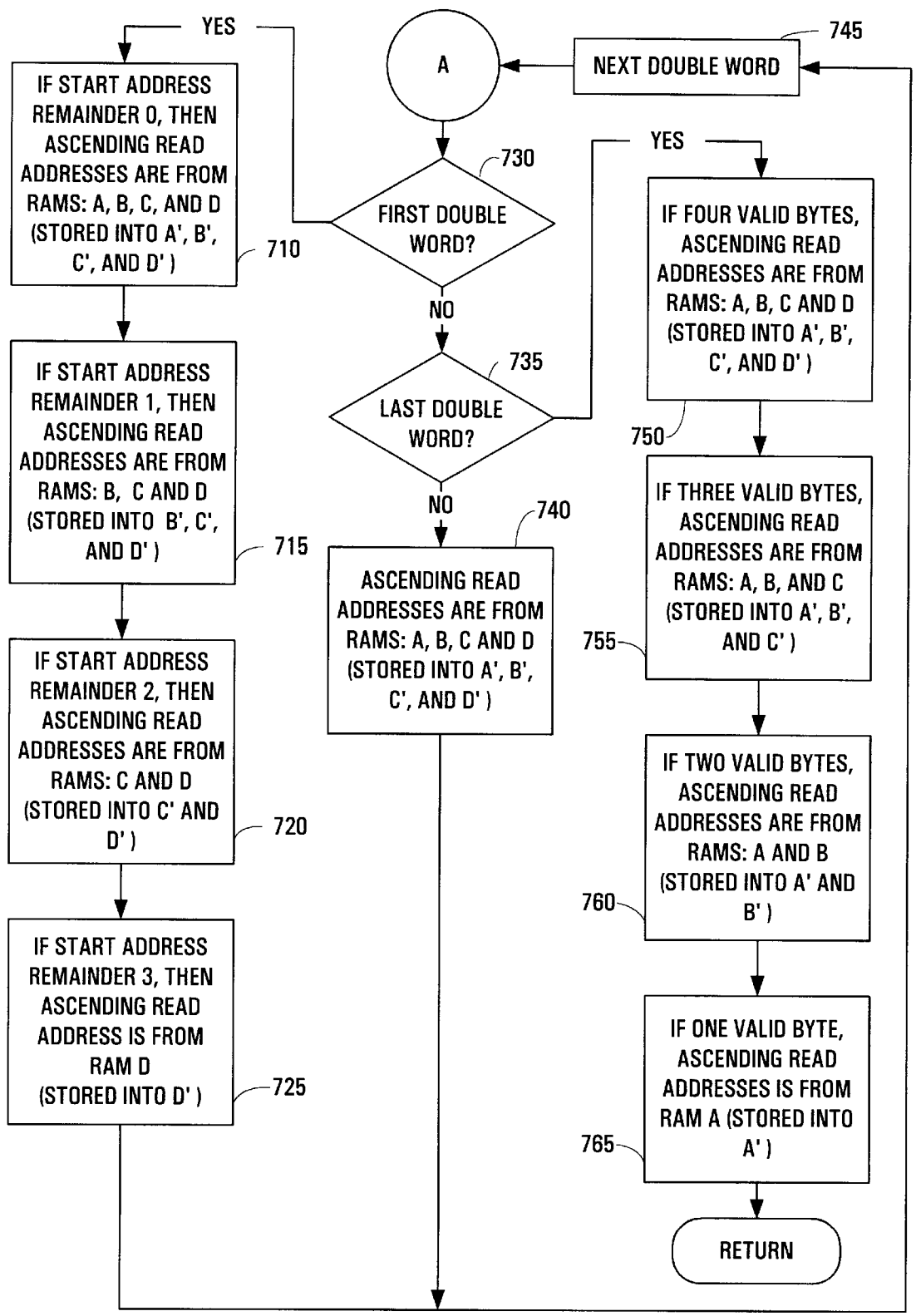
FIG. 7A is a flow diagram illustrating steps performed by the endian format conversion control logic of the present invention for processing an input data packet in little endian format and generating an output data packet in little endian format.

FIG. 7A represents the read cycle steps performed by the control unit 270 of the present invention for input data in little endian domain format and output data of little endian domain format. In this case, no endian translation is performed. At step 730, on the first pass through, the read pointer 252 is set to access the first byte of the data packet as stored in the FIFO RAMs 216, 218, 220, 222. Control circuit 270 checks if the read pointer 252 points to the first dword in the stored data packet. If so, then step 710 is entered.

At step 710, if the start address field 360 indicates a remainder of zero, e.g., the expression [(start address /4] has a remainder of zero, then the start address 360 falls on a dword boundary and step 710 continues, else step 715 is entered. At step 710, the valid bytes of the first dword would have been loaded during the write cycle into FIFO RAMs in the following order of increasing byte addresses: RAM A (216), RAM B (218), RAM C (220) and then RAM D (222). Therefore, control circuit 270 of circuit 200 controls read address register 252 to address FIFO RAM A (216), then RAM B (218), then RAM C (220) and then RAM D (222) in this order, one read clock cycle after another. In synchronization with these read cycles; multiplexer 224 under control of circuit 270, routes one byte per clock cycle from FIFO RAM A (216), RAM B (218), RAM C (220) and then RAM D (222) over bus 305 to supply an output data packet of bytes to the second bus interface 226. The read pointer 252 is updated on each clock cycle to maintain the proper byte address value. Step 745 is then entered.

If circuit 200a is used, then in step 710 FIFO RAM A is addressed and its data is stored in portion A' of 32-bit register 310b, then RAM B is addressed and its data is stored in portion B' of 32-bit register 310b, then RAM C is addressed and its data is stored in portion C' of 32-bit register 310b, and then RAM D is addressed and its the data is stored in portion D' of 32-bit register 310b. Depending on the embodiment of circuit 200a, the above can occur over separate clock cycles or can occur simultaneously, in either case using multiplexers. The 32-bit dword in register 310b is then output over 32-bit bus 315 to the second bus interface 226. Step 745 is then entered.

At step 715 of FIG. 7A, if the start address field 360 indicates a remainder of one, e.g., the expression [(start address)/4] has a remainder of one, then at most three valid bytes are in the first dword (if not step 720 is entered). Therefore, control circuit 270 controls read address register 252 to address FIFO RAM B, then RAM C and then RAM D in this order, one read clock cycle each. In synchronization during these read cycles, mux 224 under control of circuit 270 routes one byte per clock cycle over bus 305 to construct the output data packet. The read pointer 252 is updated on each of the three clock cycles. Step 745 is then entered. If circuit 200a is used, then FIFO RAM B is addressed and its data is stored in portion B' of 32-bit register 310b, then RAM C is addressed and its data is stored in portion C', and RAM D is addressed and its data is stored in portion D'. Depending on the implementation of circuit 200a, the above can occur over separate clock cycles or can occur simultaneously. The 32-bit dword in 310b is then output over 32-bit bus 315 to the second bus interface 226. Step 745 is then entered.

At step 720 of FIG. 7A, if the start address field 360 indicates a remainder of two, e.g., the expression [(start address)/4] has a remainder of two, then at most two valid bytes are in the first dword (if not step 725 is entered). Therefore, control circuit 270 controls read address register 252 to address FIFO RAM C and then RAM D in this order, one read clock cycle each. In synchronization during these read cycles, mux 224 under control of circuit 270 routes one byte per clock cycle over bus 305 to supply the output data packet. The read pointer 252 is updated on each of the two clock cycles. Step 745 is then entered. If circuit 200a is used, then FIFO RAM C is addressed and stored in portion C' of 32-bit register 310b, and RAM D is addressed and the data is stored in portion D'. Depending on the implementation of circuit 200a, the above can occur over separate clock cycles or can occur simultaneously. The 32-bit dword in 310b is then output over 32-bit bus 315 to the second bus interface 226. Step 745 is then entered.

At step 725 of FIG. 7A, the start address field 360 indicates a remainder of three, e.g., the expression [(start address)/4] has a remainder of three, therefore at most one valid byte is in the first dword. Therefore, control circuit 270 controls read address register 252 to address FIFO RAM D. Mux 224 under control of circuit 270, during this read cycle, routes the byte over bus 305 to supply the byte in the output data packet. The read pointer 252 is updated once. Step 745 is then entered. If circuit 200a is used, then RAM D is addressed and the data is stored in portion D'. The 32-bit dword in 310b is then output over 32-bit bus 315 to the second bus interface 226. Step 745 is then entered.

At step 730, if the dword was not the first dword in the data packet, then step 735 checks if it was the last dword. If so, step 750 is entered. If not step 740 is entered. At step 750, if the trailing dword has four valid bytes then over four clock cycles, RAM A, then B, then C, and then D are read, respectively, and in circuit 200, mux 224 generates a four byte stream over bus 305 in the above order (otherwise step 755 is entered). Process A then returns. In circuit 200a, the data bytes from RAM A, B, C, and D, are read by read pointer 252 and stored in portions A', B', C', and D', respectively, of 32-bit register 310b and 32-bit register 310b is output over 32-bit bus 305. This can occur in parallel or under separate clock cycles. The read pointer 252 is updated for each byte read. Process A then returns.

At step 755 of FIG. 7A, if the trailing dword has three valid bytes then over three clock cycles, RAM A, then B, and then C are read, respectively, and in circuit 200, mux 224 generates a three byte stream over bus 305 in the above order (otherwise step 760 is entered). Process A then returns. In circuit 200a, the data bytes from RAM A, B, and C, are read by read pointer 252 and stored in portions A', B', and C', respectively, of 32-bit register 310b and 32-bit register 310b is output over 32-bit bus 305. This can occur in parallel or under separate clock cycles. The read pointer 252 is updated for each byte read. Process A then returns.

At step 760 of FIG. 7A, if the trailing dword has two valid bytes then over two clock cycles, RAM A and RAM B are read, respectively, and in circuit 200, mux 224 generates a two byte stream over bus 305 in the above order (otherwise else step 765 is entered). Process A then returns. In circuit 200a, the data bytes from RAM A and RAM B are read by read pointer 252 and stored in portions A' and B', respectively, of 32-bit register 310b and 32-bit register 310b is output over 32-bit bus 305. This can occur in parallel or under separate clock cycles. The read pointer 252 is updated for each byte read. Process A then returns.

At step 765 of FIG. 7A, if the trailing dword has one valid byte then over one clock cycle, RAM A is read, and in circuit 200, mux 224 generates a one byte stream over bus 305. Process A then returns. In circuit 200a, the data byte from RAM A is read by read pointer 252 and stored in portion A' of 32-bit register 310b and 32-bit register 310b is output over 32-bit bus 305. The read pointer 252 is updated for each byte read. Step 745 is then entered.

At step 735, if the dword is not the first or the last dword, then it must be an intermediate dword and step 740 is entered. At step 740, intermediate dwords have four valid bytes and therefore over four clock cycles, RAM A, then B, then C, and then D are read, respectively, and in circuit 200, mux 224 generates a four byte stream over bus 305 in the above order. Step 745 is then entered. In circuit 200a, the data bytes from RAM A, B, C, and D, are read by read pointer 252 and stored in portions A', B', C', and D', respectively, of 32-bit register 310b and 32-bit register is output over 32-bit 305. This can occur in parallel or under separate clock cycles. The read pointer 252 is updated for each byte read. Step 745 is then entered.

At step 745 of FIG. 7A, the read pointer 252 has been incremented appropriately to point to the next dword in the FIFO RAMs 216, 218, 220, and 222. Step 730 is then entered again.

Figure 7B:
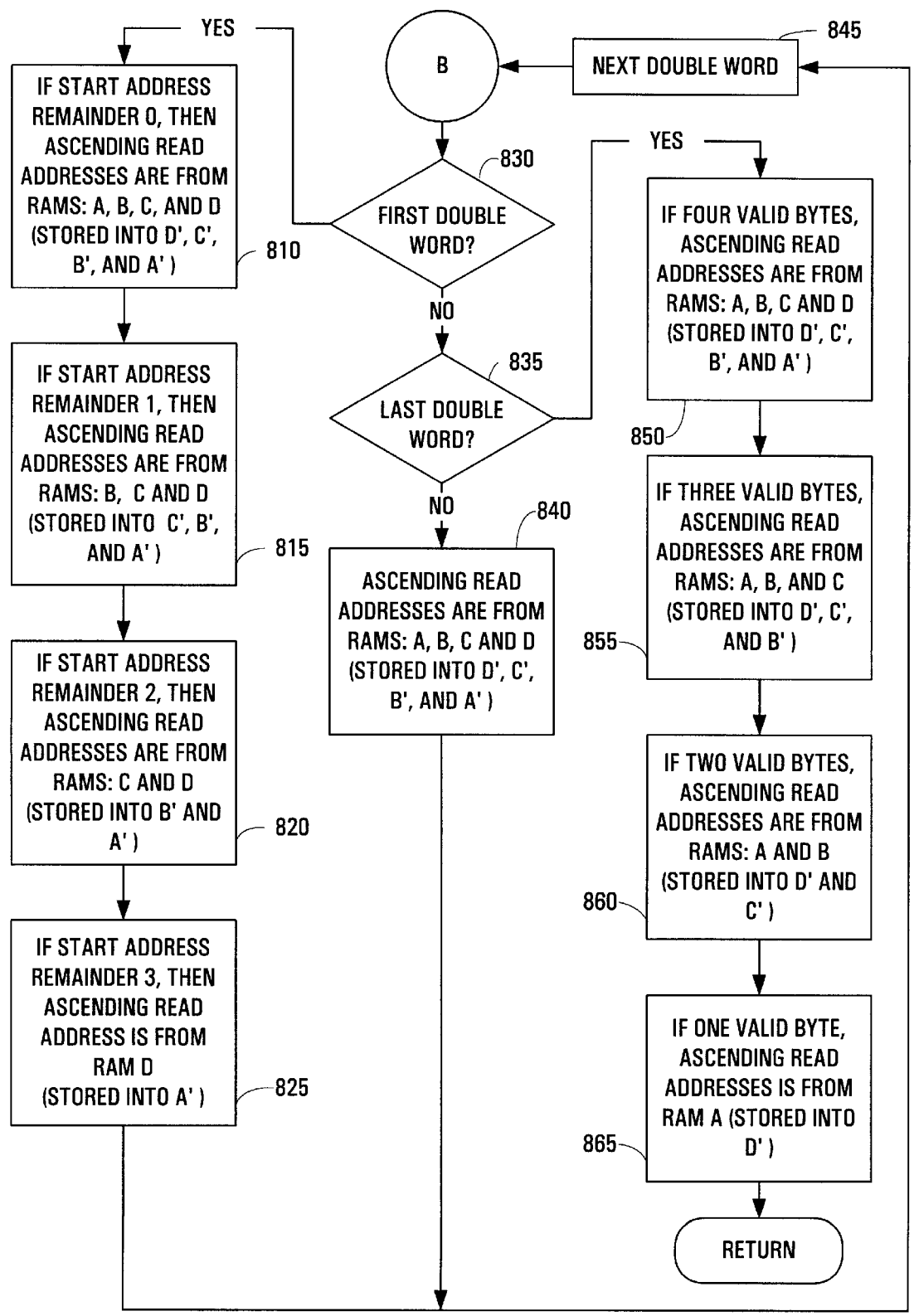
FIG. 7B is a flow diagram illustrating steps performed by the endian format conversion control logic of the present invention for processing an input data packet in little endian format and generating an output data packet in big endian format.

FIG. 7B represents the read cycle steps performed control unit 270 of the present invention for input data in little endian domain format and output data of big endian domain format. The steps are analogous to those of FIG. 7A except endian conversion is performed by the present invention during the read back. The differences are described below. In step 810 and step 840 and step 850, for circuit 200, four bytes are read from RAM A, then RAM B, then RAM C and then RAM D and supplied in a byte stream. In circuit 200a, these four bytes are stored in portions D', C', B' and A', respectively, within 32-bit register 310b and supplied as a 32-bit dword performing endian conversion. At step 815, in circuit 200, three bytes are read from RAM B, then RAM C and then RAM D and supplied in a byte stream. In circuit 200a, these three bytes are stored in portions C', B' and A', respectively, within 32-bit register 310b and supplied over bus 315 in a 32-bit dword. At step 820, in circuit 200, two bytes are read from RAM C and RAM D and supplied in a byte stream. In circuit 200a, these two bytes are stored in portions B' and A', respectively, within 32-bit register 310b and supplied over bus 315 in a 32-bit dword. At step 825, in circuit 200, one byte is read from RAM D and supplied in a byte stream. In circuit 200a, this byte is stored in portion A' within 32-bit register 310b and supplied over bus 315 in a 32-bit dword.

At step 855, for circuit 200, three bytes are read from RAM A, then RAM B and then RAM C and supplied in a byte stream. In circuit 200a, these three bytes are stored in portions D', C' and B', respectively, within 32-bit register 310b and supplied over bus 315 in a 32-bit dword. At step 860, for circuit 200, two bytes are read from RAM A and then RAM B and supplied in a byte stream. In circuit 200a, these two bytes are stored in portions D' and C', respectively, within 32-bit register 310b and supplied over bus 315 in a 32-bit dword. At step 865, for circuit 200, one byte is read from RAM A and supplied in a byte stream. In circuit 200a, this byte is stored in portion D' within 32-bit register 310b and supplied over bus 315 in a 32-bit dword.

Figure 7C:
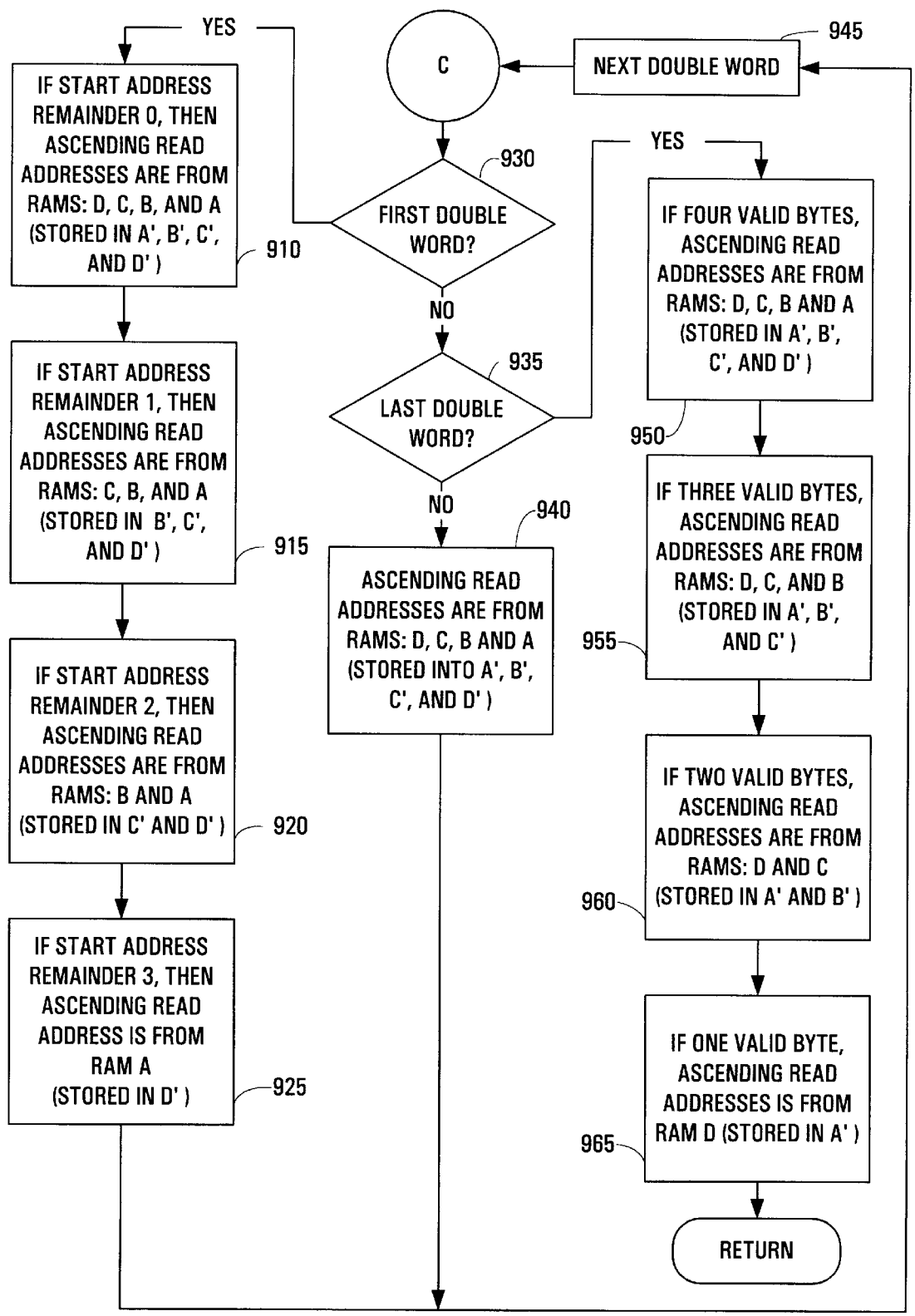
FIG. 7C is a flow diagram illustrating steps performed by the endian format conversion control logic of the present invention for processing an input data packet in big endian format and generating an output data packet in little endian format.

FIG. 7C represents the read cycle steps performed by the control unit 270 of the present invention for input data in big endian domain format and output data of little endian domain format. The steps are analogous to those of FIG. 7B except that the inverse endian conversion is performed by the present invention during the read back. The differences are described below. In step 910 and step 940 and step 950, in circuit 200, four bytes are read from RAM D, then RAM C, then RAM B and then RAM A and supplied in a byte stream to interface 226 in the above order. In circuit 200a, these four bytes are stored in portions A', B', C' and D', respectively, within 32-bit register 310b and supplied over bus 315 in a 32-bit dword. At step 915, for circuit 200, three bytes are read from RAM C, then RAM B and then RAM A and supplied in a byte stream in the above order. In circuit 200a, these three bytes are stored in portions B', C' and D', respectively, within 32-bit register 310b and supplied over bus 315 in a 32-bit dword. At step 920, for circuit 200, two bytes are read from RAM B and then RAM A and supplied in a byte stream in the above order. In circuit 200a, these two bytes are stored in portions C' and D', respectively, within 32-bit register 310b and supplied over bus 315 in a 32-bit dword. At step 925, for circuit 200, one byte is read from RAM A and supplied in a byte stream. In circuit 200a, this byte is stored in portion D' within 32-bit register 310b and supplied over bus 315 in a 32-bit dword.

At step 955, for circuit 200, three bytes are read from RAM D, then RAM C and then RAM B and supplied in a byte stream in the above order. In circuit 200a, these three bytes are stored in portions A', B' and C', respectively, within 32-bit register 310b and supplied over bus 315 in a 32-bit dword. At step 960, in circuit 200, two bytes are read from RAM D and RAM C and supplied in a byte stream in the above order. In circuit 200a, these two bytes are stored in portions A' and B', respectively, within 32-bit register 310b and supplied over bus 315 in a 32-bit dword. At step 965, in circuit 200, one byte is read from RAM D and supplied in a byte stream. In circuit 200a, this byte is stored in portion A' within 32-bit register 310b and supplied over bus 315 in a 32-bit dword.

Figure 7D:
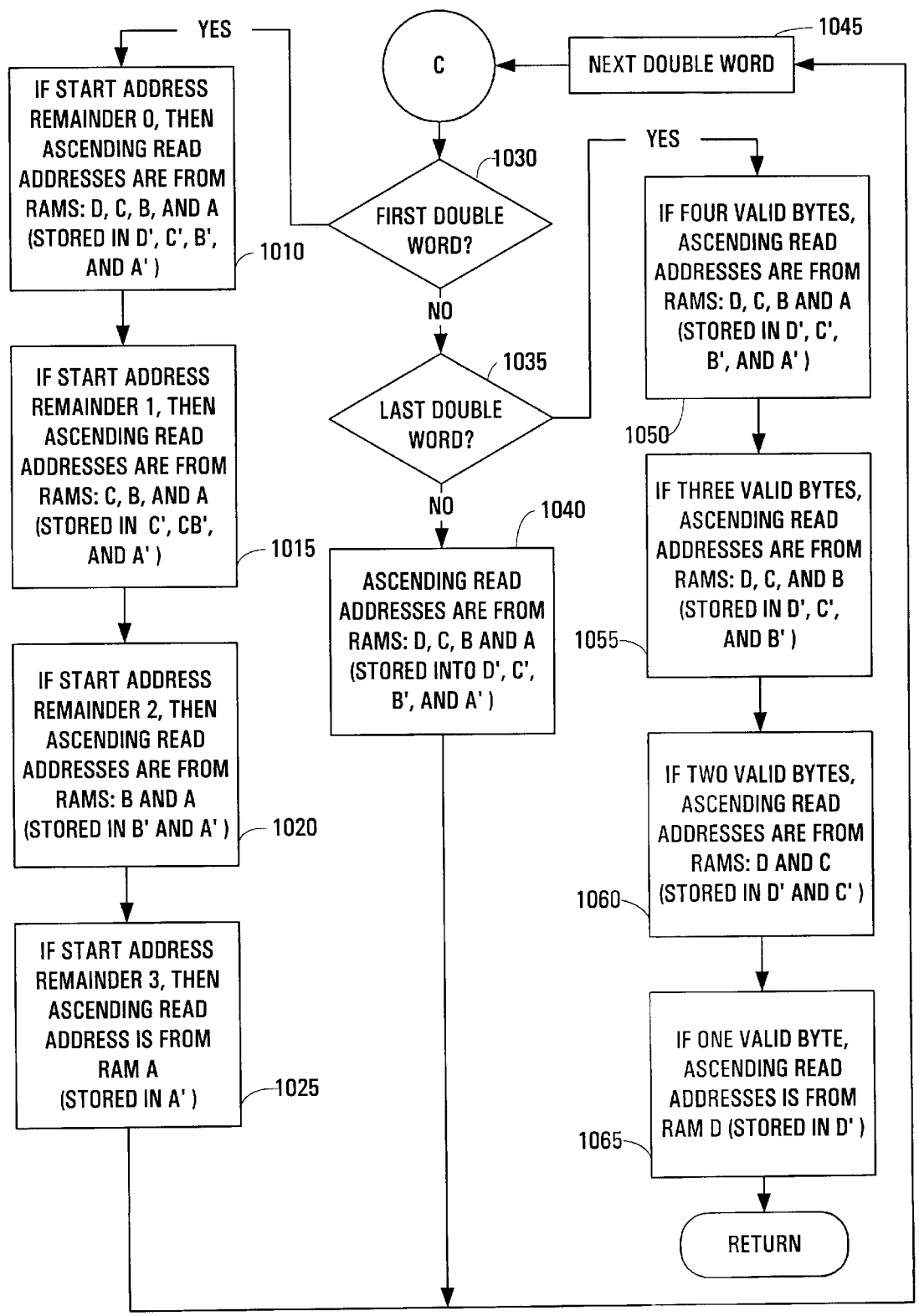
FIG. 7D is a flow diagram illustrating steps performed by the endian format conversion control logic of the present invention for processing an input data packet in big endian format and generating an output data packet in big endian format.

FIG. 7D represents the read cycle steps performed by the control unit 270 of the present invention for input data in big endian domain format and output data of big endian domain format. The steps are analogous to those of FIG. 7C except that no endian conversion is performed by the present invention during the read back. The differences are described below. In step 1010 and step 1040 and step 1050, for circuit 200, four bytes are read from RAM D, then RAM C, then RAM B and then RAM A and supplied in a byte stream to interface 226 in the above order. In circuit 200a, these four bytes are stored in portions D', C', B' and A', respectively, within 32-bit register 310b and supplied over bus 315 in a 32-bit dword. At step 1015, in circuit 200, three bytes are read from RAM C, then RAM B and then RAM A and supplied in a byte stream in the above order. In circuit 200a, these three bytes are stored in portions C', B' and A', respectively, within 32-bit register 310b and supplied over bus 315 in a 32-bit dword. At step 1020, for circuit 200, two bytes are read from RAM B and then RAM A and supplied in a byte stream in the above order. In circuit 200a, these two bytes are stored in portions B' and A', respectively, within 32-bit register 310b and supplied over bus 315 in a 32-bit dword. At step 1025, in circuit 200, one byte is read from RAM A and supplied in a byte stream. In circuit 200a, this byte is stored in portion A' within 32-bit register 310b and supplied over bus 315 in a 32-bit dword.

At step 1055 of FIG. 7D, for circuit 200, three bytes are read from RAM D, then RAM C and then RAM B and supplied in a byte stream in the above order. In circuit 200a, these three bytes are stored in portions D', C' and B', respectively, within 32-bit register 310b and supplied over bus 315 in a 32-bit dword. At step 1060, in circuit 200, two bytes are read from RAM D and then RAM C and supplied in a byte stream in the above order. In circuit 200a, these two bytes are stored in portions D' and C', respectively, within 32-bit register 310b and supplied over bus 315 in a 32-bit dword. At step 1065, in circuit 200, one byte is read from RAM D and supplied in a byte stream. In circuit 200a, this byte is stored in portion D' within 32-bit register 310b and supplied over bus 315 in a 32-bit dword.

The preferred embodiment of the present invention, data packet descriptor-driven endian domain format conversion circuit, is thus described. While the present invention has been described in particular embodiments, it should be appreciated that the present invention should not be construed as limited by such embodiments, but rather construed according to the below claims.

What is claimed is:

1. A circuit for performing endian format conversion on an input packet originating from a first bus, said circuit comprising:

a plurality of FIFO memory units coupled to receive double words of said input packet, wherein respective bytes of a respective double word are stored in parallel in respective FIFO memory units of said plurality of FIFO memory units during a single write clock cycle;

a multiplexer coupled to each FIFO memory unit, said multiplexer controlled by a signal bus and for outputting addressed bytes from said FIFO memory units to provide an output byte stream for a second bus; and a control circuit for performing endian format conversion between said first and second bus by addressing respective FIFO memory units and controlling said multiplexer by said signal bus, said control circuit for (1) addressing respective FIFO memory units in a first order provided said input packet is in a first endian format, (2) addressing respective FIFO memory units in a second order provided said input packet is in a second endian format, (3) addressing respective FIFO memory units in a first plurality of orders provided the first double word of said input packet has one, two or three valid bytes therein, and (4) addressing respective FIFO memory units in a second plurality of orders provided the last double word of said input packet has one, two or three valid bytes therein.

2. A circuit as described by claim 1 further comprising:

a start address register; and a packet length register, wherein said input packet has at least three packet descriptors associated therewith including: a start address descriptor stored in said start address register indicating a start address of said input packet in system memory; a packet length descriptor stored in said packet length register indicating a byte length of said input packet; and an endian alignment descriptor indicating an endian format of said first bus and indicating an endian format of said second bus.

3. A circuit as described in claim 2 further comprising a register within said control circuit for storing said endian alignment descriptor.

4. A circuit as described in claim 2 further comprising:

a write pointer register for storing double word write addresses which address all of said FIFO memory units in parallel per write cycle to store a double word of said input packet; and a sequencer circuit coupled to receive said start address descriptor and said packet length descriptor from said start address register and said packet length register, respectively, said sequencer circuit for controlling said write pointer register.

5. A circuit as described in claim 1 further comprising an output register coupled to receive said output byte stream from said multiplexer and for supplying an output packet of double words to said second bus, said output register storing said output byte stream in a first byte order provided said output packet is to be in said first endian format and storing said output byte stream in a second byte order provided said output packet is to be in said second endian format.

6. A circuit as described in claim 1 wherein said first bus is a Peripheral Component Interface (PCI) bus.

7. A circuit as described in claim 1 wherein each FIFO memory unit of said plurality of FIFO memory units is a 128 byte random access memory unit (RAM).

8. A circuit for performing endian format conversion on an input packet originating from a first bus, said circuit comprising:

a plurality of FIFO memory units coupled to receive a plurality of double words of said input packet, wherein respective bytes of a respective double word are stored into respective FIFO memory units of said plurality of FIFO memory units;

a multiplexer coupled to each of said plurality of FIFO memory units, said multiplexer controlled by a signal bus and for generating an output packet for a second bus;

a write pointer register for storing double word write addresses which address all of said FIFO memory units in parallel per write cycle to store a double word of said input packet;

a read pointer register for storing byte read addresses of said FIFO memory units which address only one FIFO memory unit per read cycle; and a control circuit for reading an endian alignment descriptor of said input packet indicating a first endian format of said input packet and a second endian format of said output packet, said control circuit responsive to said endian alignment descriptor for performing endian conversion during read cycles of said plurality of FIFO memory units by controlling said read pointer register and said signal bus to access and supply bytes from said plurality of FIFO memory units in predetermined orders.

9. A circuit as described in claim 8 further comprising a register within said control circuit for storing said endian alignment descriptor and wherein said control circuit, during read cycles, addresses respective FIFO memory units in a first order provided said input packet is in said first endian format and addresses respective FIFO memory units in a second order provided said input packet is in said second endian format.

10. A circuit as described by claim 8 wherein said input packet has at least three packet descriptors associated therewith including a start address descriptor indicating a start address of said input packet in system memory, a packet length descriptor indicating a byte length of said input packet, and said endian alignment descriptor.

11. A circuit as described in claim 9 further comprising a sequencer circuit coupled to receive said start address descriptor and coupled to receive said packet length descriptor, said sequencer circuit for controlling said write pointer register during read cycles.

12. A circuit as described in claim 8 further comprising an output register coupled to said multiplexer and for supplying an output packet of double words to said second bus, said output register storing bytes in a first byte order provided said output packet is to be in said first endian format and storing bytes in a second byte order provided said output packet is to be in said second endian format.

13. A circuit as described in claim 8 wherein said first bus is a Peripheral Component Interface (PCI) bus interface.

14. A circuit as described in claim 8 wherein each FIFO memory unit of said plurality of FIFO memory units is a 128 byte random access memory unit (RAM).

15. A method of performing endian format conversion on an input packet originating from a first bus, said method comprising the steps of:
   a) storing a plurality of double words of said input packet into a plurality of FIFO memory units, wherein respective bytes of a respective double word are stored in parallel into respective FIFO memory units;
   b) performing endian format conversion between said first bus and a second bus by addressing respective FIFO memory units and controlling a signal bus coupled to a multiplexer, said step b) comprising the steps of:
      b1) addressing respective FIFO memory units in a first order provided said input packet is in a first endian format;
      b2) addressing respective FIFO memory units in a second order provided said input packet is in a second endian format;
      b3) addressing respective FIFO memory units in a first plurality of orders provided said first double word of said input packet has one, two or three valid bytes therein; and
      b4) addressing respective FIFO memory units in a second plurality of orders provided said last double word of said input packet has one, two or three valid bytes therein; and
   c) with said multiplexer coupled to each FIFO memory unit, outputting addressed bytes from said FIFO memory units to provide a byte stream of an output packet for said second bus.

16. A method as described by claim 15 further comprising the step of receiving associated with said input packet at least three packet descriptors including: a start address descriptor indicating a start address of said input packet; a packet length descriptor indicating a byte length of said input packet; and an endian alignment descriptor indicating an endian format of said input packet and indicating an endian format of said output packet.

17. A method as described in claim 15 wherein step a) comprises the steps of:
   a1) receiving a respective double word of said input packet; and
   a2) incrementing a write pointer register which stores a double word write address for addressing all of said FIFO memory units in parallel to store said respective double word.

18. A method as described in claim 15 further comprising the steps of:
   d) storing said byte stream from said multiplexer into an output register, wherein step d) comprises the steps of:
      d1) storing said byte stream in a first byte order provided said output packet is to be in said first endian format; and
      d2) storing said byte stream in a second byte order provided said output packet is to be in said second endian format; and
   e) supplying double words from said output register to said second bus as said output packet.

19. A method as described in claim 15 wherein said first bus is a Peripheral Component Interface (PCI) bus.

* * * * *